July 29, 1952  S. C. ROCKAFELLOW  2,605,448
ELECTRIC WELDING CONTROL WITH PHASE SHIFT
Filed Aug. 9, 1950
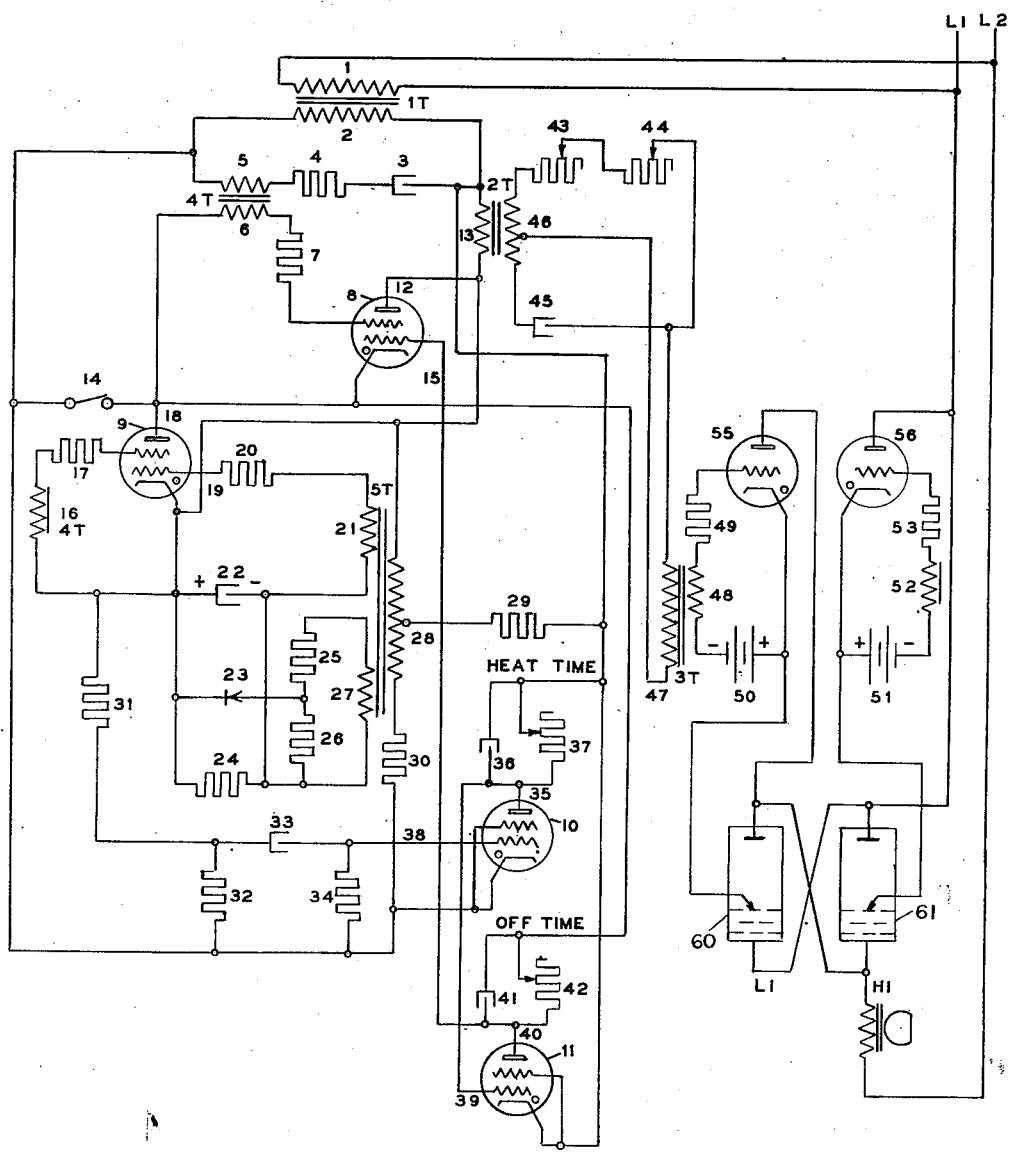
STUART C. ROCKAFELLOW
Inventor Patented July 29, 1952

2,605,448

UNITED STATES PATENT OFFICE 2,605,448

ELECTRIC WELDING CONTROL WITH PHASE SHIFT

Stuart C. Rockafellow, Farmington, Mich., assignor to Robotron Corporation

Application August 9, 1950, Serial No. 178,463

15 Claims. (Cl. 315—197)

This invention relates to an electronic control system and has particular relation to an electronic control system, especially adapted for use with seam welders, in which the full wave output of a timing circuit is phase shifted to energize a welding circuit at a precise, preselected, time.

In most forms of seam welding it is desirable to accurately control the point on the alternating current wave at which the weld starts, the duration of the weld cycle, the duration of the cool or off cycle, and to control the amount of current supplied to the welding transformer. This latter is preferably accomplished by means of phase shift.

In presently known systems accomplishing this general purpose, the control is subject to variations due to voltage variations and transient conditions. This obstacle has, in the past, made necessary many additional control units to compensate for these variations. Particularly, mechanical devices for accomplishing the present purposes have been suggested but they are insufficiently flexible to meet the present demands for accurate control of short periods of time, such as one cycle of 60 cycle current.

This invention meets these problems by using a simple, yet accurate, electronic timing circuit controlling the current fed to a phase shift network. Means for correcting for the power factor of the welding load are incorporated in the phase shift network along with the conventional phase shifting means. The current pulses for the timing circuit are phase shifted through this network and fed to the grids of firing tubes. The pulses to the grids of the firing tubes overcome negative bias and allow the firing tubes to fire at the correct instant. The firing tubes allow the ignitrons to fire in the conventional manner.

In the drawings:

Figure 1 shows diagrammatically the circuit of the system.

Referring now to the figure, a power source of any suitable type is indicated at $L_1$ and $L_2$. This source energizes the primary 1 of a transformer 1T. Said primary energizes in a conventional manner the secondary 2 of said transformer and this provides the power source for the timing portion of the circuit. At 8 and 9 are indicated small type thyratron tubes of conventional type each having an anode and cathode, heater, control grid and shield grid. Either of the grids may be used as control elements in this type of tube.

These tubes are connected in parallel, but with their respective anodes and cathodes reversed with respect to each other, and said parallel circuit is then connected at one end through the switch 14 to one side of the secondary 2 and at its other end through the transformer 2T to the other side of the secondary 2. Also connected across the terminals of the secondary 2 and in series with each other are the capacitor 3, the resistance 4, and the primary winding 5 of transformer 4T. The secondary winding 6 of transformer 4T is connected at one end to the cathode of tube 8 and at the other end through a resistance 7 to the shield grid of tube 8. The secondary 16 of transformer 4T is connected at one end to the cathode of tube 9 and at the other end through a resistance 17 to the shield grid of tube 9. The purpose of these circuits is to impose a small amount of leading potential onto the shield grids of the tubes 8 and 9. This potential allows these tubes to fire on the forward portion of the wave and this will cause a substantially complete wave form to flow through the phase shift network. This is obtained by having enough leading current introduced into the primary 5 of the transformer 4T by the capacitor 3 and the resistor 4 to cause both tubes 8 and 9 to conduct very close to the zero point of the wave. Placed in parallel with the circuit comprising the tube 9 and the switch 14 is the primary winding 28 of the transformer 5T. Its secondary 21 is connected through the resistance 20 to the control grid of the thyratron 9 and through the resistance 24 to the cathode of the thyratron 9. This circuit is so phased that when the anode 18 of the thyratron 9 is at positive potential the secondary 21 will supply negative pulses to the control grid 19 and thereby tend to hold the tube 9 non-conducting. To further protect the tube 9 from firing before necessary, the secondary winding 27 is also provided for the transformer 5T and each of its ends is connected through resistances 25 and 26 to the rectifier 23 which in turn is connected to the cathode side of the capacitor 22. The other side of said capacitor is connected to the grid 19. Thus, pulses through the primary 28 of the transformer 5T in both directions will maintain a constant, though small, negative potential on the grid side of the capacitor 22.

The thyratrons 8 and 9, just described, are the firing tubes and control the positive and negative pulses through the primary winding 13 of the transformer 2T. These firing tubes in turn are controlled by the thyratrons 10 and 11 as will now be explained.

For convenience in reference, the side of the secondary 2 which is connected to the cathode of the tube 8 will be referred to as the "left" side of said secondary and the side which is connected through the secondary 13 of the transformer 2T and thence to the anode of the tube 8 referred to as the "right" side thereof. This terminology is solely for convenience in reference to the diagram and has no other purpose.

The thyratrons 10 and 11 are both conventional, small type thyratrons and are each provided with a cathode, an anode, a heater, control grid and shield grid. The cathode and shield grid of the tube 10 is connected to the left side of the secondary winding 2 of transformer 1T. The anode of the tube 10 is connected through a time controlled circuit, comprising the capacitor 36 and the variable resistance 37 in parallel, to other side of the secondary 2 of transformer 1T. The control electrode 38 of tube 10 is connected through the resistor 34 to the cathode of the tube 10 and is also connected through the capacitor 33 and the resistor 32 to the left side of the secondary 2. The resistor 31 is connected at one side to a point between the resistor 32 and the capacitor 33 and at its other side through the primary 13 of transformer 2T to the right side of the secondary 2 of transformer 1T. This provides a voltage divider network to hold the potential on the electrode 38 within the proper limits.

The right hand side of secondary 2 is connected through a resistance 29 to a point intermediate the ends of the primary 28 of transformer 5T. Tube 11 has its shield grid and cathode connected to the right side of the secondary 2 of transformer 1T and its anode is connected through a timing network, comprising the capacitor 41 and variable resistance 42 connected in parallel to the left side of the secondary 2. The anode of said tube 11 is also connected to the control grid 15 of the tube 8, and the anode of the tube 10 is connected to the control grid 39 of the tube 11.

The secondary 46 of the transformer 2T is connected at its one side to a pair of variable resistances 43 and 44 in series with each other and its other side to one side of the capacitor 45. The other side of said capacitor is connected to the free end of variable resistance 44. A point intermediate the ends of the secondary 46 is connected to one side of the primary 47 of transformer 3T and the other side of said primary is connected at a point between the capacitor 45 and the resistor 44.

The firing tubes 55 and 56 are of the type conventionally used to start ignition type tubes.

The tube 55 has in its grid circuit a constant voltage source 50 connected in series with the secondary 48 of the transformer 3T and the resistance 49. The tube 56 has in its grid circuit a constant potential 51 connected in series with the secondary 52 of transformer 3T and the resistance 53. The firing tubes 55 and 56 are connected in a conventional manner to igniter circuits of the ignitrons, and these ignitrons are connected in a conventional back-to-back circuit in a circuit including the welding transformer H1 and the power source L1—L2.

*Operation*

With the switch 14 open, only the tube 10 is conducting. This charges the capacitor 36 with a negative potential at its anode end and said potential is also placed on the control grid 39 of the tube 11, thus rendering said tube 11 non-conductive. At this time also both negative and positive pulses are passing through the primary 28 of the transformer 5T and through the action of the secondary winding 21 and 27 a negative potential is being held on the control electrode 19 of the tube 9. Also, pulses from the left side of secondary 2 of the transformer 1T are passing through the resistance 32 and charging the capacitor 33, said capacitor circuit being completed by grid to cathode conduction in tube 10 and through the primary 28 of transformer 5T and the primary 13 of transformer 2T to the right side of the secondary tube. Thus, with switch 14 in open position the condition of the timing circuit is as follows:

Tube 10 is conducting and charging capacitor 36 which holds tube 11 blocked. Capacitor 33 is charging, but to such polarity that it does not interfere with the conduction of tube 10. Capacitor 22 is also charging and a negative potential is held on the control electrode of the tube 9. No current is passing through the primary 13 excepting the small amount permitted by the grid to cathode conduction in tube 10 which is negligible insofar as the firing tubes 55 and 56 are concerned, and thus the said firing tubes and the associated ignitrons are inactive.

When the switch 14 is closed, the thyratron 8 will conduct on one-half cycle, which may be for convenience termed the "positive" half cycle and the thyratron 9 is in position to conduct on the other half cycle, which for convenience may be termed the "negative" half cycle, but the tube 9 will not so conduct because of the negative charge on the electrode 19. However, as soon as the tube 8 conducts, it effectively shorts the positive half cycles through said tubes and prevents their passing through the primary 28 of the transformer 5T. This, in effect, reverses the polarity of the transformer 5T so that when the anode of tube 9 becomes positive on a negative half cycle, its grid is also positive and permits the tube to conduct and thus it passes the negative half cycle. Thus, both negative and positive half cycles will pass through the primary 13 of transformer 2T and because of the leading potential imposed upon the shield grids of tubes 8 and 9 as above described, the primary 13 will be subjected to substantially the full wave provided by the power source.

With the shorting of the positive half cycle through the tube 8, the capacitor 33 ceases charging and acts to place a negative potential on the control grid 38 of the tube 10. This blocks the tube 10 and permits the capacitor 36 to commence discharging through the variable resistance 37. Said capacitor 36, however, for a period of time continues to hold the tube 11 blocked and hence the tubes 8 and 9 continue to conduct. This is the "heat time" and will continue for so long as the capacitor 36 holds the tube 11 blocked.

When capacitor 36 has drained sufficiently that the tube 11 will commence to conduct, such conduction will start to charge the capacitor 41, and simultaneously impose a negative potential onto the control electrode 15 of the tube 8. This blocks the tube 8 and re-establishes a potential in the circuit including the transformer 5T and the capacitor 33. This immediately effects the blocking of the tube 9 and simultaneously permits the tube to resume conducting. With the resumed conduction of the tube 10 the tube 11 becomes blocked. The capacitor 41 now drains through variable resistance 42 but continues to hold the tube 8 blocked until the potential in capacitor 41 reaches a pre-determined lower level. The time required for it to reach such a level is the "off-time." When it does reach such a level, the tube 8 will resume conduction and the cycle will repeat. It will be evident that so long as the switch 14 remains closed, the above described cycle will continue to repeat and the duration of "heat time" and "off-time" will be controlled by the setting of the variable resistance 37 and 42 respectively.

The full wave current passing through the primary 13 will induce a similar full wave in the secondary 46 and the phase thereof may be shifted according to presently known principles by adjusting one of the variable resistances 43 and 44. One of these variable resistors has about twice the resistance of the other. The one with the larger resistance is used for phase shift and is of such a value, according to presently known principles, as to give 180 degrees shift. The smaller variable resistance is used as a power factor control and is adjusted, with the other variable resistor completely closed, so as to start the final conduction through the firing tubes 55 and 56 at that point of the wave which is at the power factor of the welding transformer and load.

The phase shifted full wave current from the timer now passes through the primary 47 of the transformer 3T. The constant negative sources 50 and 51 provide a bias on the firing tubes 55 and 56 and keep said tubes from firing until said bias is overcome by the energization thus mentioned of the primary 47 acting through the secondaries 48 and 52. Thus, tubes 55 and 56 will fire, and fire the ignitrons 60 and 61 in a conventional manner at the point at which the negative bias of the sources 50 and 51 is overcome. This will be governed by the amount of phase shift introduced. The ignitrons will continue to conduct so long as pulses continue through the primary 13 of the transformer 2T and will cease when said pulses cease.

Accordingly, I have provided a circuit of great accuracy but of relative simplicity as compared with former circuits of this type and for this purpose.

I claim:

1. An electronic control circuit comprising in combination: a source of alternating potential; a pair of electric discharge devices, each having an anode, a cathode, a shield grid and a control grid; means imposing onto the control grid of each electric discharge device a leading potential sufficient to cause said electric discharge devices to conduct at a point near the zero point of the wave form emanating from said source; means controlling the periods of conduction and non-conduction of said electric discharge devices; a phase shift circuit and means supplying the output of said discharge devices to said phase shift circuit; a load and means connecting said load to a source of alternating potential; a pair of ignitron type electric discharge devices connected in back-to-back relationship and in series with said load circuit and a pair of ignitron controlling electric discharge devices and means connecting same into the igniter circuits of said ignitron electric discharge devices; means providing a constant negative bias potential on each of the control electrodes of said ignitron controlling electric discharge devices and means within said circuits of said electrodes and energized by said phase shift circuit to overcome said constant bias when the pulse wave in said phase shift circuit reaches a predetermined potential: whereby the conduction and non-conduction of said ignitrons is controlled by said timing circuit and the precise point on the wave-form at which conduction by the ignitrons is started and determined by the phase shift circuit.

2. An electronic control circuit for opening and closing a switch comprising in combination: a source of alternating potential; a pair of electric discharge devices, each having an anode, a cathode, a shield grid and a control grid; means connecting said electric discharge devices to said source in parallel with each other and of opposite polarity with respect to each other; means imposing onto the control grid of each electric discharge device a leading potential sufficient to cause said electric discharge devices to conduct at a point near the zero point of the waveform emanating from said source; means controlling the periods of conduction and non-conduction of said electric discharge devices; a switch, a phase shift circuit receiving the output of the said electric discharge devices and means energized by said phase shift circuit for opening and closing said switch, said means including means providing a constant potential normally holding said switch open and including further means so adapted that energization thereof by the said phase shift circuit overcomes said constant potential at a precisely controllable time and thereby effects the closing of said switch.

3. An electronic timing control circuit for opening and closing a switch comprising in combination: a power source; a first electric discharge device having an anode, a control electrode and a cathode; a transformer having primary and secondary windings and said electric discharge device being connected at its anode and its cathode in series with the primary winding of said transformer and said power source; a second electric discharge device having an anode, a cathode and a control electrode and being connected by its anode and its cathode in parallel with said first electric discharge device and in opposite polarity with respect thereto; a second transformer having a primary winding and a pair of secondary windings, said primary winding being connected in parallel with said second electric discharge device, one of said secondary windings being connected at its one end to the control electrode of said second electric discharge device and at its other end to the cathode thereof, and the other of said secondary windings being connected at each of its ends through a pair of resistances and a rectifier to one side of a capacitor, and the other side of said capacitor being connected to said control electrode of said second electric discharge device; a phase shift circuit including the secondary winding of said first transformer and means energized by said phase shift circuit to actuate said switch.

4. An electronic timing control circuit for opening and closing a switch comprising in combination: a power source; a first electric discharge device having an anode, a control electrode and a cathode; a transformer having primary and secondary windings, said electric discharge device being connected at its anode and its cathode in series with the primary winding of said transformer and said power source; a second electric discharge device having an anode, a cathode and a control electrode and being connected by its anode and its cathode in parallel with said first electric discharge device and in opposite polarity with respect thereto; a second transformer having a primary winding and a pair of secondary windings, said primary winding being connected in parallel with said second electric discharge device, one of said secondary windings being connected at its one end to the control electrode of said second electric discharge device and at its other end to the cathode thereof, and the other of said secondary windings being connected at each of its ends through a pair of resistances and a rectifier to one side of a first capacitor, and the other side of said capacitor being connected to said control electrode of said second electric discharge device; third and fourth electric discharge devices each having an anode, a cathode and a control electrode; means connecting the cathode of said third electric discharge device to the same side of said power source as the cathode of said first electric discharge device; a circuit including a second capacitor and a resistor in parallel with each other connecting the anode of said third electric discharge device to the opposite side of said power source and means connecting the anode of the third electric discharge device also to the control electrode of the fourth electric discharge device; means connecting the cathode of said fourth electric discharge device to said other side of said power source and a circuit including a third capacitor and a resistor in parallel connecting the anode of said fourth electric discharge device to the same side of said power source as is connected the cathode of the first electric discharge device; and means also connecting the anode of said fourth electric discharge device to the control electrode of the first electric discharge device; a fourth capacitor and means connecting one side thereof to said last named side of said power source and means connecting the other side thereof to the control electrode of the third electric discharge device; and means energized by said primary of said first transformer for opening and closing said switch.

5. In an electronic timing device for opening and closing a switch, the combination comprising: a first transformer having a primary winding and a secondary winding; an electrical network supplying a substantially full wave of alternating electric potential to said primary winding and said network including means initiating and terminating the supplying of said wave to said primary winding; a pair of variable resistors and a capacitor in series with each other and means connecting same in series with said secondary winding; a second transformer having a primary winding and means connecting one end of said primary winding to a point between said capacitor and one of the said variable resistors nearest thereto; and means connecting the other end of said last named primary winding to the said secondary winding of said first transformer at a point intermediate the ends thereof; an electrical network connected with said secondary winding of said second transformer for opening and closing said switch.

6. In an electrical timing and control circuit for use with a source of electrical potential and a load, the combination comprising: a first transformer having primary and secondary windings, an electrical network including timing control means for delivering substantially full wave pulses to the primary winding of said transformer and means included therein for automatically starting and stopping the flow of said pulses; a phase shift circuit and means supplying said circuit from the secondary winding of said transformer; a second transformer including primary and secondary windings and means energized from said phase shift circuit connected to the primary winding of said second transformer; an electric network controlling said switch and including an electrical discharge device having a control electrode, means providing a constant bias, said control electrode opposing conduction by the electric discharge device; means connecting the secondary winding of said second transformer into the circuit of said control electrode in such polarity that a pulse induced therein by a pulse in one direction in the primary winding in said first transformer will overcome said bias and cause the electric discharge device to conduct; means responsive to said conduction of said electric discharge device for closing said switch; whereby the time of closing of said switch may be accurately controlled by the adjusting of the phase shift so that a pulse delivered from the phase shift network will overcome said constant bias at a precisely predeterminable point on the waveform supplied by said source.

7. An electronic timing control circuit for opening and closing a switch comprising in combination: a power source; a first electric discharge device having an anode, a control electrode and a cathode; a first transformer having primary and secondary windings, said electric discharge device being connected at its anode and its cathode in series with the primary winding of said transformer and said power source; a second electric discharge device having an anode, a cathode and a control electrode and being connected by its anode and its cathode in parallel with said first electric discharge device and in opposite polarity with respect thereto; a second transformer having a primary winding and a pair of secondary windings, said primary winding being connected in parallel with said second electric discharge device, one of said secondary windings being connected at its one end to the control electrode of said second electric discharge device and at its other end to the cathode thereof; a pair of resistances connected in series; a rectifier; means connecting the free ends of said resistances to each respective end of the other of said secondary windings and means connecting the mutually connected ends of said resistances through said rectifier to one side of a first capacitor, and the other side of said capacitor being connected to said control electrode of said second electric discharge device; third and fourth electric discharge devices each having an anode, a cathode and a control electrode; means connecting the cathode of said third electric discharge device to the same side of said power source as the cathode of said first electric discharge device; an adjustable time-constant circuit connecting the anode of said third electric discharge device to the opposite side of said power source and means connecting the anode of the third electric discharge device also to the control electrode of the fourth electric discharge device; means connecting the cathode of said fourth electric discharge device to said other side of said power source and means including an adjustable time-constant circuit connecting the anode of said fourth electric discharge device to the same side of said power source as is connected the cathode of the first electric discharge device; and means also connecting the anode of said fourth electric discharge device to the control electrode of the first electric discharge device; a fourth capacitor and means connecting one side thereof to said last named side of said power source and means connecting the other side thereof to the control electrode of the third electric discharge device; and means energized by said primary of said first transformer for opening and closing said switch.

8. An electric timing control circuit for opening and closing a switch comprising in combination: a power source; a first electric discharge device having an anode, a control electrode and a cathode; a first transformer having primary and secondary windings, said electric discharge device being connected at its anode and its cathode in series with the primary winding of said transformer and said power source; a second electric discharge device having an anode, a cathode and a control electrode and connected by its anode and its cathode in parallel with said first electric discharge device and in opposite polarity with respect thereto; a second transformer having a primary winding and a pair of secondary windings, said primary winding being connected in parallel with said second electric discharge device, one of said secondary windings being connected at its one end to the control electrode of said second electric discharge device and at its other end to the cathode thereof, a pair of resistances connected in series; a rectifier; a first capacitor; means connecting the free ends of said resistances to each respective end of the other of said secondary windings and means connecting the mutually connected ends of said resistances through said rectifier to one side of said first capacitor, and the other side of said first capacitor being connected to said control electrode of said second electric discharge device; a first time controllable means normally blocking said first electric discharge device; second time controllable means normally blocking said first time controllable means; means for blocking said second time controllable means; a capacitor and means connected from one side of said capacitor to the same side of said source as the cathode of the first electric discharge device and means connected from the other side of said capacitor to said means blocking said second time controllable means for energizing same.

9. An electric timing control circuit for opening and closing a switch comprising in combination: a power source; a first electric discharge device having an anode, a control electrode and a cathode; a first transformer having primary and secondary windings, said electric discharge device being connected at its anode and its cathode in series with the primary winding of said transformer and said power source; a second electric discharge device having an anode, a cathode and a control electrode and being connected by its anode and its cathode in parallel with said first electric discharge device and in opposite polarity with respect thereto; a second transformer having a primary winding and a pair of secondary windings, said primary winding being connected in parallel with said second electric discharge device, one of said secondary windings being connected at its one end to the control electrode of said second electric discharge device and at its other end to the cathode thereof, a pair of resistances connected in series; a rectifier; a first capacitor; means connecting the free ends of said resistances to each respective end of the other of said secondary windings and means connecting the mutually connected ends of said resistances through said rectifier to one side of said first capacitor, and the other side of said capacitor being connected to said control electrode of said second electric discharge device; first and second automatically controllable switches, each having an electrically responsive control means; means connecting the input side of said first automatically controlled switch to the same side of said power source as the cathode of said first electric discharge device; an adjustable time constant circuit connecting the output side of said first automatically controllable switch to the other side of said power source and means connecting the output side of said first automatically controllable switch also to the control means of said second automatically controllable switch; means connecting the input side of said second automatically controllable switch to said other side of said power source and means including an adjustable time-constant circuit connecting the output side of said second automatically controllable switch to the same side of said power source as is connected the cathode of said first electric discharge device; and means also connecting the output side of said second automatically controllable switch to the control electrode of the first electric discharge device; a further capacitor and means connecting one side thereof to the last named side of said power source and means connecting the other side thereof to the control means of the first automatically controllable switch; and means energized by said primary of said first transformer for opening and closing said first named switch.

10. An electronic timing control circuit for opening and closing a switch comprising in combination: a power source; a first electric discharge device having an anode, a control electrode and a cathode; a first transformer having primary and secondary windings, said electric discharge device being connected at its anode and its cathode in series with the primary winding of said transformer and said power source; a second electric discharge device having an anode, a cathode and a control electrode and being connected by its anode and its cathode in parallel with said first electric discharge device and in opposite polarity with respect thereto; a second transformer having a primary winding and a pair of secondary windings, said primary winding being connected in parallel with said second electric discharge device, one of said secondary windings being connected at its one end to the control electrode of said second electric discharge device and at its other end to the cathode thereof, a pair of resistances connected in series; a rectifier; a first capacitor; means connecting the free ends of said resistances to each respective end of the other of said secondary windings and means connecting the mutually connected ends of said resistances through said rectifier to one side of said first capacitor, and the other side of said capacitor being connected to said control electrode of said second electric discharge device; means controlling the periods of conduction and non-conduction of said electric discharge devices within predetermined time limits; and means energized by the primary winding of said first transformer for opening and closing said switch.

11. Apparatus defined in claim 3 including also means imposing onto the control electrode of each of said first and second electric discharge devices a leading potential sufficient to cause said first and second electric discharge devices to conduct at a point near the zero point of the wave-form emanating from said source.

12. An electronic control circuit for opening and closing a switch comprising in combination: a source of alternating potential; a pair of electric discharge devices, each having an anode, a cathode, a shield grid and a control grid; means connecting said electric discharge devices to said source in parallel with each other and of opposite polarity with respect to each other; means imposing onto the control grid of each electric discharge device a leading potential sufficient to cause said electric discharge devices to conduct at a point near the zero point of the wave-form emanating from said source; means controlling the periods of conduction and non-conduction of said electric discharge devices; a first transformer, having its primary winding in the anode circuit of one of said electric discharge devices; a pair of variable resistors and a capacitor in series with each other and means connecting same in series with the secondary winding of said first transformer; a second transformer having a primary winding and means connecting one end of said primary winding to a point between capacitor and one of the said variable resistors nearest thereto; and means connecting the other end of said last named primary winding to the said secondary of said first transformer at a point intermediate the ends thereof; an electrical network connected with said secondary winding of said second transformer for opening and closing said switch.

13. An electronic control circuit for opening and closing a switch comprising in combination: a source of alternating potential; a pair of electric discharge devices having an anode, a cathode, a shield grid and a control grid; means connecting said electric discharge devices to said source in parallel with each other and of opposite polarity with respect to each other; means imposing onto the control grid of each electric discharge device a leading potential sufficient to cause said electric discharge devices to conduct at a point near the zero point of the wave-form emanating from said source; means controlling the periods of conduction and non-conduction of said electric discharge devices; a switch; a phase shift circuit receiving the output of the said electric discharge devices and means energized by said phase shift circuit for opening and closing.

14. An electronic control circuit for opening and closing a switch, comprising in combination: a source of alternating potential; a transformer having primary and secondary windings; means including a pair of electric discharge devices connected to said source in parallel with each other and in opposite polarity with respect to each other energizable from said source providing intermittent timed pulses to the primary winding of said transformer; a phase shift circuit including the secondary winding of said transformer; means energized by said phase shift circuit for opening and closing said switch.

15. An electronic control circuit for opening and closing a switch comprising in combination: a source of alternating potential; a pair of electric discharge devices having an anode, a cathode, a shield grid and a control grid; means connecting said electric discharge devices to said source in parallel with each other and of opposite polarity with respect to each other; means controlling the periods of conduction and non-conduction of said electric discharge devices; a switch; a phase shift circuit receiving the output of the said electric discharge devices and means energized by said phase shift circuit for opening and closing said switch.

STUART C. ROCKAFELLOW.

REFERENCES CITED

The following references are of record in the file of this patent:

UNITED STATES PATENTS

| Number | Name | Date |
|---|---|---|
| 1,851,692 | Zucker | Mar. 29, 1932 |
| 2,263,773 | Gulliksen | Nov. 25, 1941 |
| 2,289,321 | Collom | July 7, 1942 |
| 2,370,071 | Poole | Feb. 20, 1945 |
| 2,473,238 | Bivens | June 14, 1949 |